United States Patent Office.

JOHN GOMERSALL, OF MANSFIELD, MASSACHUSETTS, ASSIGNOR TO E. WINSLOW, OF WEST ROXBURY, MASSACHUSETTS.

Letters Patent No. 61,532, dated January 29, 1867.

IMPROVED COMPOSITION FOR OILING WOOL.

*The Schedule referred to in these Letters Patent and making part of the same.*

TO ALL WHOM IT MAY CONCERN:

Be it known that I, JOHN GOMERSALL, of Mansfield, in the county of Bristol, and State of Massachusetts, have invented an Improved Composition for Lubricating Wool preparatory to being carded; and I hereby declare the following to be a full, clear, and exact description thereof.

In the preparation of wool for carding it is necessary that a lubricating substance be distributed throughout its fibres to facilitate the drawing or carding operation. Oil, or a composition consisting chiefly of oil, has been used for this purpose, but it is objectionable on account of its high cost. To produce a dressing which shall render the fibres soft and pliant, and which may be furnished at a small cost, is the object of my invention, which I will now proceed to describe in such terms that others skilled in the art may be enabled to understand and use the same.

Take eighty-four gallons of soft water and add thereto the following ingredients in about the proportions given below, viz, seven and a half pounds of aqua ammonia, four gallons of "elaine" (lard) oil, one gallon of a solution obtained by boiling eight ounces of dry Irish moss in water, one gallon of a solution in water of two and a half pounds of borax, one gallon of a solution in water of two and a half pounds of sal soda. The whole, when thoroughly mixed and incorporated together, and passed through a strainer, is ready for use. The composition above described is not so liable to thicken in cold weather, and is peculiarly adapted for softening wool or "shoddy," and by its use the color of the wool when dyed is not changed, which, together with the fact that it may be furnished at a trifling cost, makes it more desirable than the lubricating substances ordinarily employed for this purpose. In addition to the advantages above enumerated, my improved dressing does not heat or injure the clothing or cards, and it also serves as a soap, which effectually cleanses and whitens the wool, etc. It is evident that the proportions of the above-named ingredients may be slightly varied without departing from the spirit of my invention; but the ingredients mixed in the proportions above recited I have found to answer well.

*Claim.*

What I claim as my invention, and desire to secure by Letters Patent, is—

The within-described composition for dressing wool or shoddy, consisting of the ingredients mixed in the proportions substantially as set forth.

JOHN GOMERSALL.

Witnesses:
P. E. TESCHEMACHER,
N. W. STEARNS.